United States Patent [19]
Tremblay et al.

[11] Patent Number: 5,636,399
[45] Date of Patent: Jun. 10, 1997

[54] MOVABLE RAMP ASSEMBLY

[75] Inventors: Jules M. Tremblay, Sunland, Calif.; Percy Fretwell, Lancashire, England; Stanton D. Saucier, Tarzana, Calif.

[73] Assignee: Ricon Corporation, Pacoima, Calif.

[21] Appl. No.: 395,556

[22] Filed: Feb. 27, 1995

[51] Int. Cl.$^6$ .................. A61G 3/06; B60P 1/32
[52] U.S. Cl. .................. 14/71.1; 414/537; 414/921
[58] Field of Search .................. 14/69.5, 71.1, 14/71.3; 296/61; 414/537, 921, 522; 280/166

[56] References Cited

U.S. PATENT DOCUMENTS

| | | | |
|---|---|---|---|
| 4,325,668 | 4/1982 | Julian et al. | 414/921 X |
| 4,339,224 | 7/1982 | Lamb | 414/921 X |
| 4,466,771 | 8/1984 | Thurley et al. | 414/787 |
| 4,685,857 | 8/1987 | Goeser et al. | |
| 4,759,682 | 7/1988 | Hood | 414/921 X |
| 4,827,538 | 5/1989 | Hood | |
| 4,845,792 | 7/1989 | Bakula et al. | 14/71.1 X |
| 4,850,788 | 7/1989 | Dickson | 414/537 |
| 5,257,894 | 11/1993 | Grant | 414/537 |
| 5,259,081 | 11/1993 | Henderson | 296/61 X |
| 5,284,414 | 2/1994 | Kempf | 414/921 X |
| 5,299,904 | 4/1994 | Simon et al. | 414/921 X |
| 5,305,486 | 4/1994 | Smith et al. | 14/69.5 |
| 5,380,144 | 1/1995 | Smith et al. | 414/921 X |
| 5,391,041 | 2/1995 | Stanbury et al. | 414/921 X |
| 5,393,192 | 2/1995 | Hall et al. | 414/921 X |
| 5,433,580 | 7/1995 | Kempf | 414/921 X |

FOREIGN PATENT DOCUMENTS

| | | | |
|---|---|---|---|
| 374154 | 3/1984 | Austria | B62D 25/22 |
| 4234064 | 5/1993 | Germany | 14/69.5 |

*Primary Examiner*—James Lisehora
*Attorney, Agent, or Firm*—Darby & Darby, P.C.

[57] ABSTRACT

A movable ramp assembly is provided that can be securely stored and safely and reliably operated. The ramp assembly includes a platform that is conveniently stored to travel with a vehicle and deployed in a motion pattern to allow the passage of passengers across the platform into and out of the vehicle. The motion pattern includes an upwardly inclined motion and a downwardly inclined motion which together accommodate most uneven terrain on which the vehicle may be parked. In the disclosed embodiment, the motion pattern of the platform is faciliated by cam guides formed within side beams of a mounting structure and cam followers provided on bracket arms supporting the platform at one end. As the cam followers follow the cam guides, the platform is pitched upwardly at an incline and then downwardly at an incline when the platform is deployed from storage. As part of the top panel of the mounting structure, a hinged panel is provided, having multiple functions. In the disclosed embodiment, the hinged panel is substantially horizontal when the platform is stored so as to serve as part of the operating passenger floor with the top panel. When the platform is deployed; however, the hinged panel is inclined downwardly to abut a threshold section of the platform at its free end, thereby bridging the platform and the top panel to form an extended ramp surface.

23 Claims, 3 Drawing Sheets

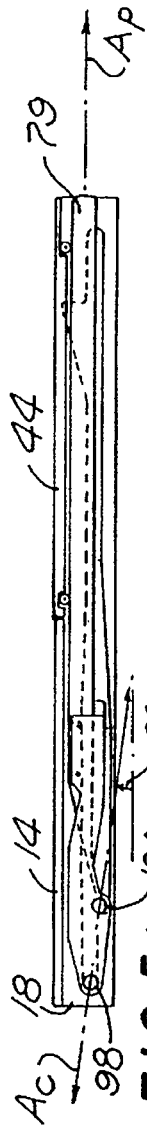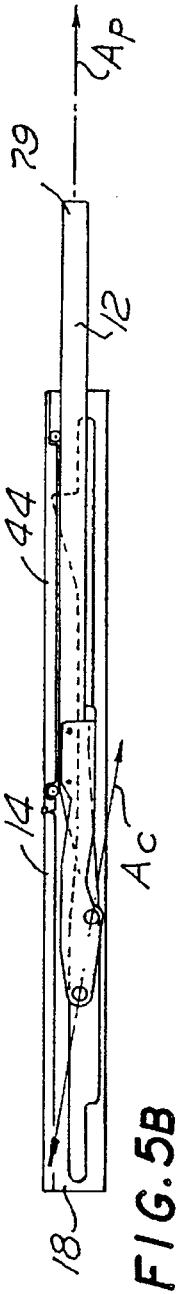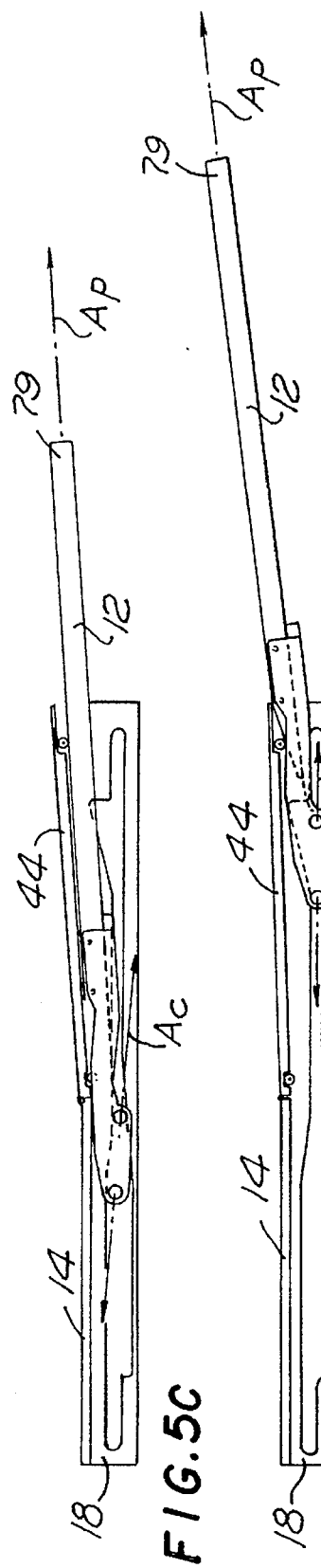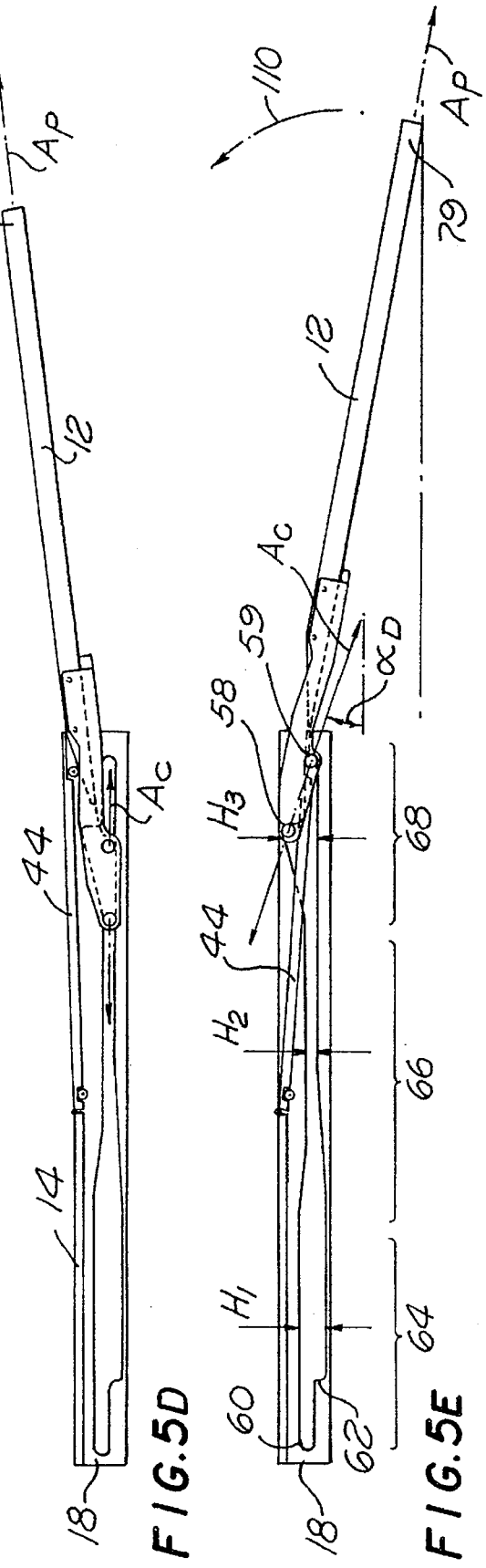

5,636,399

MOVABLE RAMP ASSEMBLY

FIELD OF THE INVENTION

This invention relates generally to ramps facilitating passengers to board and unload from vehicles, in particular, ramps facilitating access to persons with limited mobility.

BACKGROUND OF THE INVENTION

A growing concern exists for persons who are physically challenged or otherwise have limited mobility. That concern has given rise to the development of structures to accommodate such persons. Such developments have included the development of lifts for transporting occupied wheelchairs, and the like, in and out of vehicles. Typically, these lifts provide mobile platforms to raise and lower passengers between loading from outside the vehicles from a ground level and entry into the vehicles at a vehicle floor level.

Ramps have also been developed for enabling access into and out of vehicles. As concerning ramps which travel with the vehicles, these ramps are typically stored in the vehicles when not in use and deployed when it is necessary to provide passenger access. When such a ramp is deployed, the two ends are typically positioned at different heights. One end is usually adjacent the vehicle floor and the other end is usually on the ground. As such, depending on the terrain on which the vehicles are parked, a relative height difference exists between the vehicle floor and the ground, which may be quite substantial.

Since the passengers must travel across from one end of the ramp to the other, it is necessary that the ramp be fully deployable without obstruction by formations in the terrain. Also, when deployed, the ramp must provide a safe surface on which the passengers are supported while they travel across the ramp.

Proposed wheelchair ramps have included a platform which is pivotally connected at a lower edge to the vehicle floor. Such a platform is typically stored in an upright position and is thus deployed by swinging the platform outwardly from the vehicle about the bottom edge. Accordingly, the platform moves through a substantial range of motion, the upper edge starting from a relatively high position and ending at a relatively low position. With such a substantial range of motion, there may exists a danger of undesirable motions or displacements in which the platform may move to undesirable positions, or even free fall through space. As a result, persons nearby may sustain injuries.

Proposed wheelchair ramps have also included a ramp which translates from below the vehicle floor in a horizontal stored position to a deployed position where the ramp extends beyond the vehicle. Although these ramps may avoid the dangers associated with the other proposed wheelchair ramps and are relatively less complex in design, they are often difficult to operate. Where the terrain is particularly uneven and/or the vehicles utilizing the ramps have low vehicle floors (or low operational floors), the ramps often cannot be fully deployed. For example, where the vehicles are parked curbside, the curb often obstructs the translating ramps from reaching their full extension beyond the vehicles. This problem may be avoided by providing shortened ramps; however, shorter ramps can involve steeper surfaces on which the passengers must either ascend or descend in their wheelchairs. Consequently, there exists a need for a ramp assembly which is relatively simple in design and structure and avoids the dangers and difficulties of current vehicle ramps.

SUMMARY OF THE INVENTION

In accordance with the present invention, a wheelchair ramp assembly is provided that can be securely stored and safely and reliably operated. The ramp assembly includes a platform that is conveniently stored to travel with a vehicle and deployed in a motion pattern to allow the passage of passengers across the platform into and out of the vehicle. The motion pattern includes an upwardly inclined motion and a downwardly inclined motion which together accommodate most uneven terrain on which the vehicle may be parked. In accordance with one embodiment of the invention, the platform is stored under the vehicle floor (or the operating passenger floor) inside a mounting structure having a top panel, a bottom panel, and side beams positioned therebetween. The motion pattern of the platform when deployed is facilitated by cam guides formed within side beams of the mounting structure and cam followers provided on bracket arms supporting the platform at one end. As the cam followers follow the cam guides, the platform is pitched upwardly at an incline and then downwardly at an incline when the platform is deployed from storage.

As part of the top panel of the mounting structure, a hinged panel is provided, having multiple functions. In the disclosed embodiment, the hinged panel is substantially horizontal when the platform is stored so as to serve as part of the operating passenger floor with the top panel. When the platform is deployed; however, the hinged panel is inclined downwardly to abut a threshold section of the platform at its free end, thereby bridging the platform and the top panel to form an extended ramp surface.

These, as well as other features of the invention, will become apparent from the detailed description which follows, considered together with the appended drawings.

DESCRIPTIONS OF THE DRAWINGS

In the drawings, which constitute a part of this specification, exemplary embodiments demonstrating various features of the invention are set forth as follows:

FIGS. 5A–5E are side elevation views of the disclosed embodiment of FIG. 3; and

DESCRIPTION OF THE ILLUSTRATIVE EMBODIMENTS

As indicated above, detailed illustrative embodiments are disclosed herein. However, structures for accomplishing the objectives of the present invention may be detailed quite differently from the disclosed embodiments. Consequently, specific structural and functional details disclosed herein are merely representative; yet, in that regard, they are deemed to afford the best embodiment for purposes of disclosure and to provide a basis for the claims herein which define the scope of the present invention.

Figure 1:
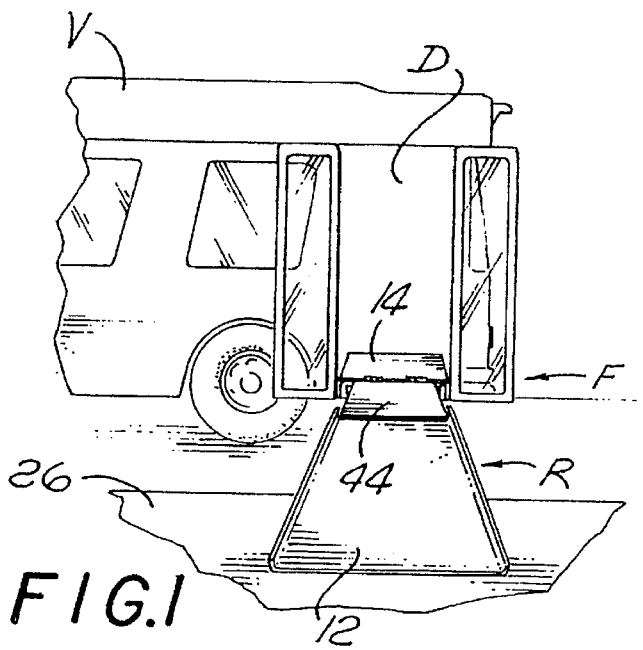
FIG. 1 is a diagrammatic representation of a partial side view of a vehicle carrying a ramp assembly in accordance with the present invention.
Figure 2:
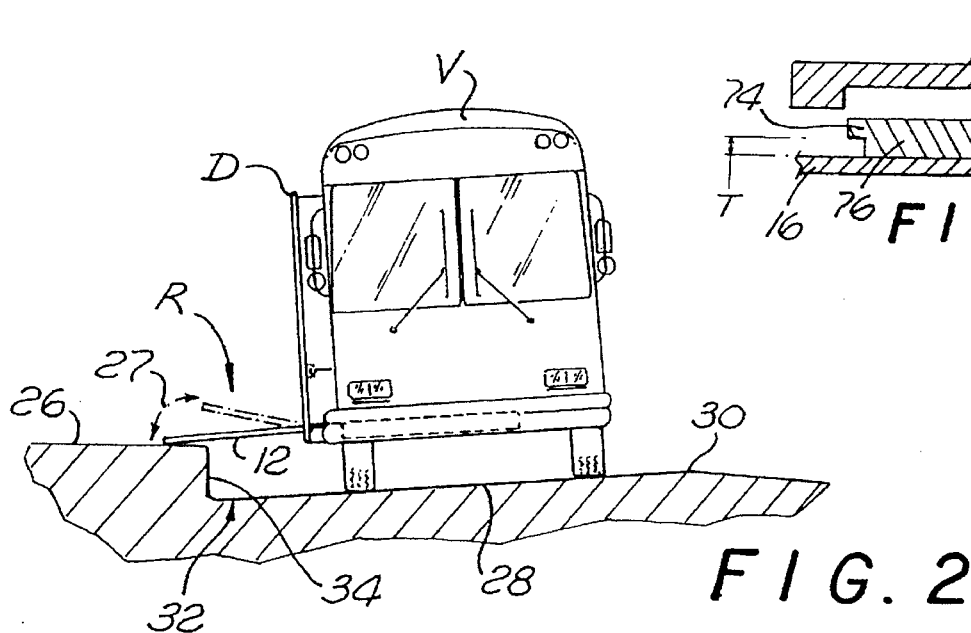
FIG. 2 is a diagrammatic representation of a front view of the vehicle and the ramp assembly of FIG. 1.

Referring to FIGS. 1 and 2, a side portion of a vehicle V is shown carrying a wheelchair ramp assembly R on which a passenger in wheelchair (not shown) may travel from ground level to a position for entering or leaving the vehicle V. The vehicle with which the ramp assembly R may be used is not limited to buses and automobiles, as illustrated, but rather may include trailers, trains, etc. or any structure for transporting people. The ramp assembly R may be secured to the rear, side or other appropriate opening of a vehicle. As illustrated in FIGS. 1 and 2, the ramp assembly R is installed at the floor F of the vehicle V to operate through a side doorway D. As briefly mentioned above, the ramp assembly R may be installed above the vehicle floor such that the passengers are supported directly on top of the ramp assembly R, that is, where a top panel of the ramp assembly R operates as the passenger floor. Or, the ramp assembly R may be installed below the vehicle floor such that the vehicle floor serves as the passenger floor.

Figure 3:
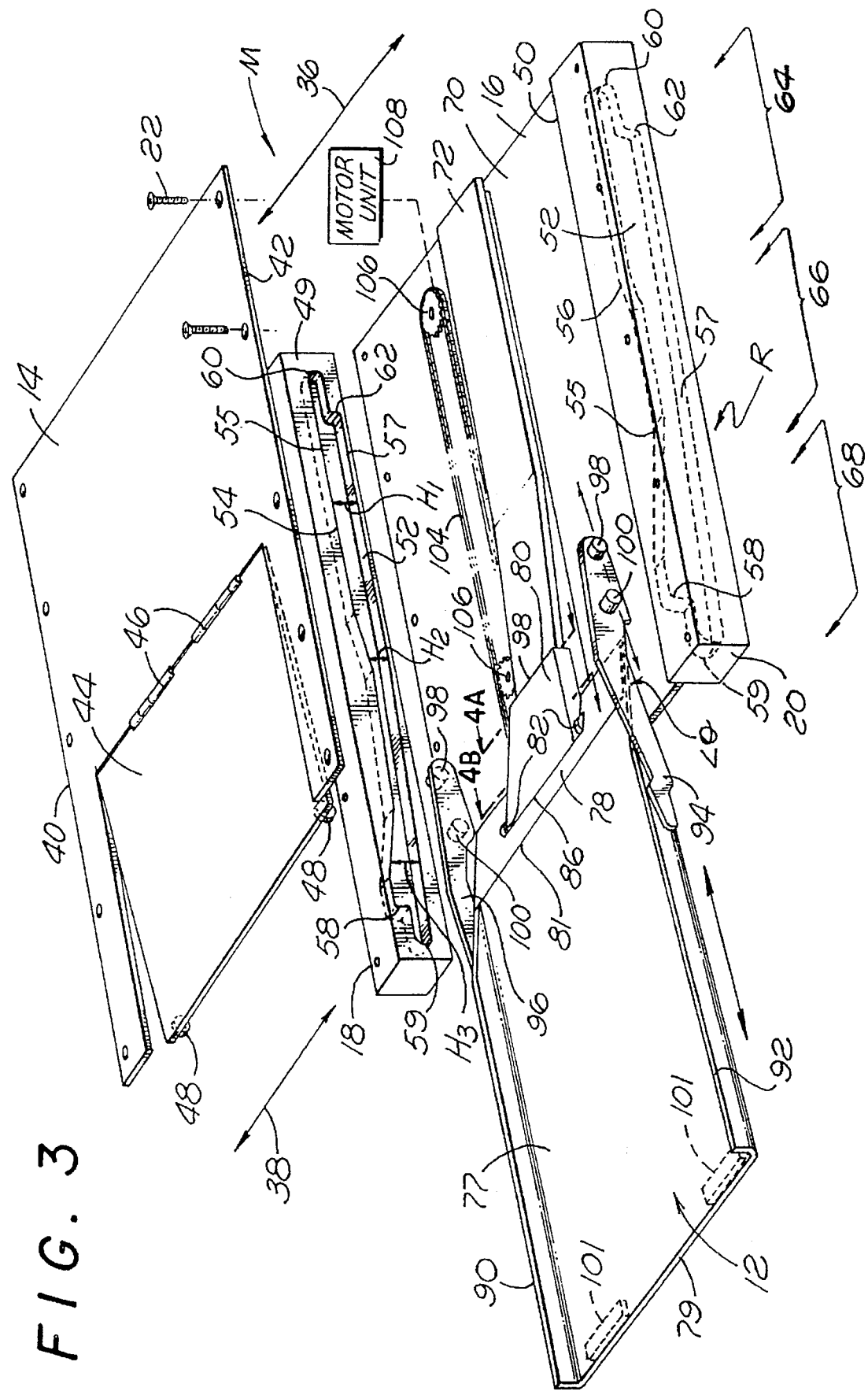
FIG. 3 is an exploded perspective view of a disclosed embodiment of the present ramp assembly.

Referring also to FIG. 3, structurally, the ramp assembly R incorporates a platform 12, a mounting structure M having a top panel 14, a bottom panel 16 and side beams 18 and 20 rigidly affixed to the panels 14 and 16 by screws 22, or the like (some are shown). Where the ramp R is installed above the vehicle floor F, the bottom panel 16 is affixed to the vehicle floor F by screws (not shown), or the like. Accordingly, consistent with the discussion above, the top panel 14 operates as the passenger floor of the vehicle V in the disclosed embodiment.

Figure 6:
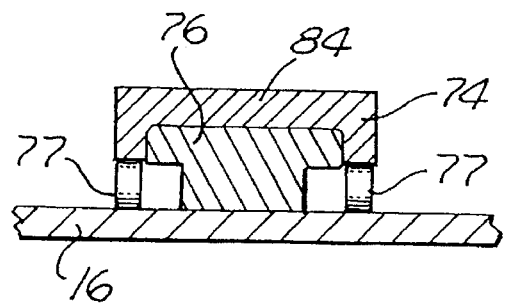
FIG. 6 is a partial cross section view of another disclosed embodiment of the alignment bracket of the platform coupled with the ridge structure of the bottom panel.

As shown in FIG. 6, equipped with the ramp R, the vehicle V can safely and reliably load and unload passengers in wheelchairs from the vehicle V to a sidewalk 26. Even though the vehicle V may be parked curbside on a road 28 with a relatively high crown 30 and a low gutter 32 adjacent a curb wall 34, the ramp R can be deployed over and onto the sidewalk 26, without being projected into the curb wall 34. In particular, the ramp R is deployed in a manner where the platform 12 moves in a motion pattern having an upwardly inclined movement and a downwardly inclined movement as indicated by an arrow 27.

Referring to FIG. 3, the ramp assembly R of one preferred embodiment is shown in an exploded view without the vehicle V. The platform 12 is movable relative to the mounting structure M where the top panels 14 and 16 generally define an inner edge 36 and an outer edge 38 for the ramp assembly R. In particular, the platform 12 is movable between the top panel 14 and the bottom panel 16 such that the platform 12 is stored between the two panels 14 and 16 while it is in a stored position (see FIG. 5A). When deployed, the platform 12 substantially extends beyond the outer edge 38 and projects from between the top and bottom panels 14 and 16 (see FIG. 5E).

The top panel 14 of the mounting structure M is substantially planar and horizontal so as to function as the passenger floor. As shown in FIG. 3, the top panel 14 has two lateral edges 40 and 42 extending between the inner edge 36 and the outer edge 38. More adjacent the outer edge 38, the top panel 14 provides a hinged portion or a hinged panel 44 that is pivotally attached to the top panel 14 by hinges 46, or the like. As such, the hinged panel 14 may pivot about the hinges 46 such that the outer edge 38 is relatively higher or lower than the top panel 14. As discussed later in detail, the hinged panel 44 may be positioned at level with the top panel 14, or angularly offset thereto, depending on whether the platform 12 is stored, partially deployed or fully deployed. To facilitate this relationship with the platform 12, a pair of rollers 48, or other similar friction-reducing structures, may be affixed to an underside of the hinged panel 44, adjacent the intersection of the lateral edges 40 and 42 and the outer edge 38.

Positioned below and extending the length of the lateral edges 40 and 42 are the side beams 18 and 20. The side beams 18 and 20 have inwardly facing surfaces 49 and 50 with channels 52 defining cam guides 54 and 56. The cam guides 54 and 56 substantially extend the length of the side beams, ending at abutments 58 and 59 adjacent the outer edge 36 and abutments 60 and 62 adjacent the inner edge 38. The cam guides 54 and 56 guide the platform 12 as it moves between the stored position and the deployed position.

To enable the platform 12 to move upwardly at an incline and downwardly at an incline in the disclosed embodiment, the cam guides 54 and 56 are distinctively shaped. Being the channels 52, the cam guides 54 and 56 provide an upper track 55 and a lower track 57 defining a distance, for example, a height H, therebetween which varies along the length of the cam guides. As shown in FIG. 3, the cam guides 54 and 56 in the disclosed embodiment provide a first section 64 adjacent the inner edge 36, with approximately a height $H_1$, then a second section 66 with approximately a lesser height $H_2$, and then a third section 68 adjacent the outer edge 38, with approximately a greater height $H_3$. The relationship between the heights H in the disclosed embodiment, for example, can be generally stated as $H_2<H_1<H_3$. Transitions between the heights H of the sections 64, 66 and 68 are substantially gradual and smooth to facilitate smooth movement of the platform 12 between the stored and deployed positions.

Figure 4A:
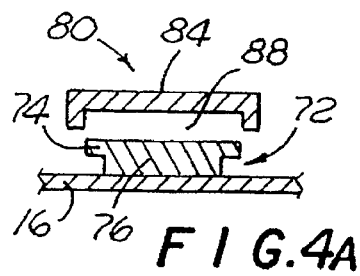
FIG. 4A is a partial cross section view of the disclosed embodiment of FIG. 1 taken along line 4A—4A.
Figure 4B:
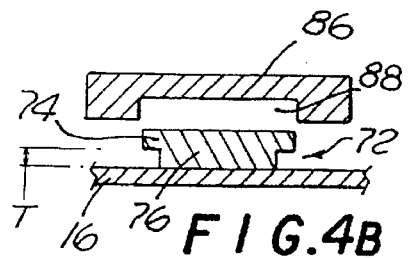
FIG. 4B is a partial cross section view of the disclosed embodiment of FIG. 1 taken along line 4B—4B.

The bottom panel 16 is positioned below the side beams 18 and 20 and substantially aligned with the top panel 14. In the disclosed embodiment, the bottom panel 16 is securely affixed to the vehicle floor F by welding, screws (not shown) or the like. On an upper surface 70, a ridge structure 72 is provided, extending between the inner edge 38 and the outer edge 36. The ridge structure 72 is also substantially centrally aligned between the side beams 18 and 20. As illustrated in FIGS. 4A and 4B, the ridge structure 72 has a T-shaped cross section with an upper track portion 74 supported on a base 76 with a height T. As explained later in detail, the ridge structure 72 is coupled to the platform 12 such that the ridge structure 72 substantially aligns the platform 12 to the mounting structure M as the platform 12 moves between the stored position and the deployed position. To that end, the height T of the base 76 increases from a minimum towards the inner edge 36 to a maximum towards the outer edge 38. In the disclosed embodiment, the height T significantly increases substantially adjacent the second section 66 of the side beams 18 and 20. Moreover, referring to FIG. 6, attached to the alignment bracket 80, rollers 77 may be provided to facilitate movement of the platform 12 along the ridge structure 72.

Referring back to FIG. 3, the platform 12 has a planar portion 77 extending between a free end 79 and a pivoting end 81. The platform 12 is rigidly connected at an offset angle θ to a threshold section 78 at the pivoting end 81. Extending from the threshold section 78 is an alignment bracket 80 which is pivotally attached to the threshold section 78 by hinges 82, or the like. As such, the alignment bracket 80 pivots about the hinges 82. Illustrated in FIGS. 4A and 4B, the alignment bracket 80 has a narrower free end 84 and a wider pivoting end 86. An underside of the alignment bracket 80 is configured to provide an indented track 88 for receiving the upper track portion 74 of the ridge structure 72. Accordingly, alignment bracket 80 rests on top of the ridge structure 72, coupling the platform 12 to the bottom panel 16 such that they are substantially aligned during operation of the ramp R.

As to the planar portion 77 of the platform 12, side edges 90 and 92 are turned upwardly as a safety feature preventing passengers in wheelchairs from falling of the platform 12 when the platform 12 is deployed. Moreover, the side edges 90 and 92 are aligned with the rollers 48 on the hinged panel 44 such that the platform 12 moves substantially frictionless beneath the hinged panel 44 as the former is deployed. The side edges 90 and 92 are tapered adjacent the threshold section 78 such the platform 12 when substantially deployed allows the rollers 48 of the hinged panel 44 to ride off the side edges 90 and 92 and onto the threshold section 78. Supported on the threshold section 78, the hinged panel 44 is pivoted about the hinges 46 such that the outer edge 38 is below the top panel 14.

Rigidly affixed to the side edges 90 and 92 adjacent the tapered region are a pair of bracket arms 94 and 96 extending slightly beyond the threshold section 78. The arms 94 and 96 are each equipped with a pair of outwardly-facing cam followers 98 and 100. The cam followers 98 and 100 have dimensions enabling them to be received in the cam guides 54 and 56 of the side beams 18 and 20. As more clearly illustrated in FIGS. 5A–5E, the cam followers 98 and 100 are positioned on the arms 94 and 96 to define both a width and a height therebetween. As such, the cam followers 98 and 100 are both vertically and horizontally offset from each other, the cam follower 98 being referred to as the upper cam follower and the cam follower 100 being referred to as the lower cam follower. An axis $A_C$ is defined between the cam followers 98 and 100. Moreover, being so configured, the upper cam followers 98 substantially track the upper track 55 of the cam guides and the cam followers 100 substantially track the lower track 57 of the cam guides.

Referring specifically to FIGS. 5A–5E, the cam followers 98 and 100 are positioned on the bracket arms 94 and 96 such that the cam axis $A_C$ is angularly offset from the platform axis $A_P$ in the disclosed embodiment. In another embodiment of the present invention, the cam axis $A_C$ may be parallel with the platform axis $A_P$. However, the overall size of the ramp assembly R, in particular, the distance between the top panel 14 and the bottom panel 16 may be reduced where the two axes $A_C$ and $A_P$ are angularly offset.

Because the bracket arms 94 and 96 rigidly connect the platform 12 and the cam followers 98 and 100, the two axes $A_C$ and $A_P$ are interrelated such that changing the angle of one axis necessarily changes the angle of the other.

Referring to FIGS. 5A–5E in greater detail, the ramp R is shown in the stored position (FIG. 5A) and the fully deployed position (FIG. 5E). In the stored position, the platform 12 is positioned substantially between the top panel 14 and the bottom panel 16. In the deployed position, the platform 12 extends substantially beyond the outer edge 38 of the mounting structure M. In accordance with the present invention, the ramp R is deployed through a motion pattern, including an upwardly incline motion (e.g., FIGS. 5B–5D) and a downwardly incline motion (e.g., FIG. 5E). As mentioned, this combination of movements enable the ramp assembly R to accommodate most terrain, especially that of a curbside where the sidewalk is relatively high compared to an adjacent gutter 32 and the crown 30 of the road. Where a vehicle utilizing the ramp assembly R to enable passengers in wheelchairs to board and exit the vehicle, the ramp assembly R is safely and reliably deployed over the curb to rest atop the sidewalk without hitting the curb wall 34. For example, the ramp assembly R is well suited for a vehicle suspended low to the ground and/or having a low vehicle floor.

In the disclosed embodiment, the movement pattern shown in FIGS. 5A–5E are enabled by the cam followers 98 and 100 guided by the cam guides 54 and 56. For example, in FIG. 5A, the platform 12 is shown in the stored position, being supported by the bracket arms 94 and 96 and the cam followers 98 and 100 in a substantially horizontal position. As clearly shown in FIG. 5A, the cam followers 98 and 100 are in the first section 64 of the cam guides 54 and 56, the upper followers 98 resting against the upper track 55 and the abutments 60 and the lower followers 100 resting against the lower track 57 and the abutments 62. The height $H_1$ of the first section 64 limits the cam axis $A_C$ at an angle $\alpha_S$, enabling the platform 12 to be stored horizontally in the mounting structure M. Accordingly, where the platform 12 has a weight W and thus exerts a torque on the cam followers 98 and 100 to pivot the axis $A_C$ clockwise (notwithstanding the bottom panel 16 and the ridge structure 72 supporting the platform 12), the height $H_1$ maintains the angle $\alpha_S$. The torque maintains a substantial force on the cam followers such that the upper cam follower 98 maintains contact with the upper track 55 and the lower cam follower 100 maintains contact with the lower track 57 throughout the movement pattern of the platform 12. Accordingly, as the cam followers 98 and 100 travel through the first section 64, the platform 12 substantially translates horizontally across the mounting structure M.

While the platform 12 is in the stored position, the hinged panel 44 is supported by the platform 12 in a substantially horizontal position, via the rollers 48 resting atop the side edges 90 and 92 of the platform 12. Thus, the hinged panel 44 is substantially even with the top panel 14, functioning as a part of the passenger floor.

Referring to FIGS. 5B–5D, the angles of the axes $A_C$ and $A_P$ vary as the platform 12 is deploying. In the disclosed embodiment, the angle of the cam axis $A_C$ decreases from the angle $\alpha_S$ (FIG. 5A) to being substantially horizontal (FIG. 5D), as motivated by the cam guides 54 and 56. As the angle of the cam axis $A_C$ decreases, the angle of the platform axis $A_P$ increases. For example, as the cam followers 98 and 100 enter into the second section 66 from the first section 64 of the cam guides 54 and 56, they are motivated by the change from height $H_1$ to height $H_2$ of the sections 64 and 66 to pivot the cam axis $A_C$. For example, as the upper track 55 is lowered and, the lower track 57 is raised, the cam axis $A_C$ turns counterclockwise. As such the platform axis $A_P$ is pitched upwardly at an incline from the horizontal and thus, the platform 12 moves upwardly at an incline.

Throughout the second section 66 of the cam guides 54 and 56, the upper track 55 is lowered and the lower track 57 is raised to further pivot the cam axis $A_C$ until it is substantially horizontal. In this position (FIG. 5D), the platform 12 is at a maximum upwardly incline, sufficient to rise above most curb walls.

As the platform 12 is moving upwardly at an incline (FIGS. 5B–5D), the alignment bracket 80 remains coupled to the ridge structure 72 because the base 76 increases accordingly in the height T. Also, while the platform 12 is being deployed, the hinged panel 44 continues to pivot about the hinges 46. Since the outer edge 38 of the hinged panel 44 rests on the side edges 90 and 92, the outer edge 36 rides up above the top panel 14 as the platform 12 moves upwardly at an incline.

Referring to FIG. 5E, as the platform 12 is further deployed and the cam followers 98 and 100 are moving from the second section 66 into the third section 68, the platform 12 moves downwardly at an incline. The height $H_3$ increases to a maximum adjacent the abutment 58 so that the platform 12, which is no longer supported underneath by the bottom panel 16, falls by its own weight to rest atop the sidewalk, for example. For example, the upper track 55 of the cam guides 54 and 56 is significantly raised while the lower track 57 is substantially maintained to motivate the cam axis $A_C$ to pivot clockwise to an angle $\alpha_D$, pitching the platform 12 at a downwardly incline. The platform 12 remains connected to the ramp assembly R upon deployment because the abutments 58 and 59 prevent the cam followers 98 and 100 from traveling beyond the outer edge 38 of the mounting structure M.

While the platform 12 is in the deployed position (FIG. 5E), the hinged panel 44 is supported substantially at a downwardly incline with the rollers 48 resting atop the threshold section 78.

With the platform 12 fully deployed, the ramp assembly R provides an extended surface on which the passengers may travel from the sidewalk to inside the vehicle or vice versa. The extended surface is a combination of the platform 12 and the hinged panel 44 which is also positioned in a downwardly incline, bridging the top panel 14 (serving as the passenger floor) and the platform 12.

As an added safety feature, a sensor 101 may be installed at the free end 79 of the platform 12 for sensing objects, such as people, which may obstruct the movement of the platform 12, or be injured by the platform 12. The sensor 101 may be an contact sensor, or other types of sensors which can detect such objects.

Thus, in operation, as the platform 12 is deployed from storage, the platform 12 moves through a pattern including an upwardly inclined motion and then a downwardly inclined motion. As shown in FIGS. 5A–5E, the free end 79 of the platform 12 sweeps as somewhat arcuate pattern (arrow 110) as it is deployed.

As the platform 12 is returned to storage from the deployed position, the platform 12 repeats the pattern in reverse (FIGS. 5E to 5A) so as to avoid dragging or otherwise substantially contacting the sidewalk 26.

The ramp assembly R may be manually operated, or motor driven. For manual operation, the platform 12 is simply pulled out from storage by its free end until fully extended. Likewise, for storing the platform 12, the platform 12 is simply pushed back into the mounting structure M.

As for a motor driven ramp assembly R, reference is made to FIGS. 3 showing a chain 104 connected to the platform 12 and wound on sprockets 106 to be driven by a motor unit 108. As the sprockets 106 are driven by the motor unit 108, the platform 12 moves along the ridge structure 72 to be deployed or returned to storage.

It may be seen that the system of the present invention may be readily incorporated in various embodiments to provide an improved ramp assembly. The various components and dimensions disclosed herein are merely exemplary, and of course, various alternative techniques may be employed departing from those disclosed and suggested herein. For example, the cam guides and the cam followers may be replaced by other structures, such as kinematic structures, for moving the platform relative to the mounting structure. Also, other driving members may be employed to motorize the present ramp. Consequently, it is to be understood that the scope hereof should be determined in accordance with the claims as set forth below.

What is claimed is:

1. A ramp assembly for use with a vehicle, comprising:
a mounting structure comprising side sections providing cam guides;
a platform moveable relative to said mounting structure between a storage position and a deployed position, and said platform moving in a motion pattern relative to said mounting structure, said motion pattern comprising an upwardly inclined translational movement and a downwardly inclined translational movement, said platform comprising cam followers engaging said cam guides to provide said motion pattern.

2. A ramp assembly in accordance with claim 1, wherein said cam guides are channels extending substantially along a length of said side sections, each of said channels defining an upper track and a lower track with a varying height therebetween.

3. A ramp assembly in accordance with claim 1, further comprising an alignment structure maintaining alignment of said platform with said cam guides during said motion pattern.

4. A ramp assembly in accordance with claim 3, wherein said platform comprises an alignment bracket engageable with said alignment structure to couple said platform to said alignment structure.

5. A ramp assembly in accordance with claim 4, wherein said platform is pivotally connected to said alignment bracket to accommodate said motion pattern of said platform while said alignment bracket is engaged with said alignment structure.

6. A ramp assembly in accordance with claim 1, wherein said upwardly inclined movement and said downwardly inclined movement of said motion pattern are each combined with a substantially horizontal translational movement.

7. A ramp assembly in accordance with claim 1, wherein said cam followers define a cam axis and said platform defines a platform axis, said cam axis being angularly offset from said platform axis.

8. A ramp assembly in accordance with claim 1, said mounting structure comprising a top panel configured to provide a pivoting portion, said pivoting portion pivoting between a first position substantially coplanar with said top panel and a second position angularly offset from said top panel.

9. A ramp assembly in accordance with claim 8, wherein said pivoting portion attains said first position when said platform is in said storage position and said second position when said platform is in said deployed position.

10. A ramp assembly in accordance with claim 8, wherein said pivoting portion in said second position forms an extended platform with said platform.

11. A ramp assembly in accordance with claim 1, further comprising a motor unit to drive said platform in said motion pattern.

12. A ramp assembly in accordance with claim 1, further comprising a sensor positioned on a free end of said platform.

13. A ramp assembly in accordance with claim 1, wherein said platform comprises brackets on which said cam followers are mounted for facilitating said platform to move in said motion pattern between said storage position and said deployed position.

14. A ramp assembly in accordance with claim 1, further comprising a bottom panel having an alignment means for aligning said platform with said cam guides during said motion pattern.

15. A ramp assembly for use with a vehicle, comprising:
a mounting structure having a top panel configured to provide a pivotal portion formed within said top panel;
a platform moveable in a motion pattern relative to said mounting structure between a storage position and a deployed position, said motion pattern comprising an upwardly inclined movement and downwardly inclined movement, each combined with a translational movement;

said pivotal portion formed within said top panel being pivotal between a first position and second position, said pivotal portion in said second position forming an extended surface from said platform to said top panel when said platform is in said deployed position.

16. A ramp assembly in accordance with claim 15, wherein said platform comprises cam followers, and wherein said mounting structure further comprises side sections configured to provide cam guides, said cam followers engaging said cam guides to provide said motion pattern.

17. A ramp assembly in accordance with claim 16, further comprising an alignment structure and an alignment bracket, said alignment bracket pivotally attached to said platform at one end and coupled with said alignment structure at another end to maintain alignment of said platform with said mounting structure as said platform moves between said deployed and storage positions.

18. A ramp assembly for use with a vehicle, comprising:
a platform moveable between a storage position and a deployed position; and
a pair of tracks with which said platform is engaged for enabling said platform to move between said storage and deployed positions, said tracks including cam quires configured to cause said platform to incline both upwardly and downwardly in sequence in relation to said pair of tracks as said platform is moved along said tracks when being either stored or deployed.

19. A ramp assembly in accordance with claim 18, wherein said platform comprises cam followers to facilitate said platform engaging said tracks.

20. A ramp assembly in accordance with claim 18, further comprising a mounting structure configured to provide an alignment structure and said platform comprises an alignment bracket engageable with said alignment structure to couple said platform to said alignment structure.

21. A ramp assembly in accordance with claim 18, further comprising a panel positioned above said pair of tracks and configured to provide a pivotal portion formed within said panel and forming and extension for said platform when deployed.

22. A ramp assembly for use with a vehicle, comprising:
a platform moveable along a substantially linear direction between a deployed position and a storage position, said platform having cam followers mounted thereon;
a mounting structure configured to provide a pair of elongated cam guides formed as channels within said mounting structure to receive said cam followers, said elongated cam guides extending along said linear direction and each cam guide having an end portion configured to enable said platform to be downwardly inclined toward said deployed position under a force of gravity;
an alignment bracket for aligning said platform with said cam guides while said platform moves between said storage and said deployed position; and,
said mounting structure having a top panel with a pivoting portion formed within said top panel to provide an extension to said platform while said platform is in a deployed position.

23. A ramp assembly in accordance with claim 22, further comprising a sensor located on said platform for detecting said positions of said platform and for detecting obstructive objects in the path of said platform.

* * * * *

UNITED STATES PATENT AND TRADEMARK OFFICE
CERTIFICATE OF CORRECTION

PATENT NO. : 5,636,399
DATED : June 10, 1997
INVENTOR(S) : Jules M. Tremblay et al.

It is certified that error appears in the above-indentified patent and that said Letters Patent is hereby corrected as shown below:

Column 9, line 28, change "quires" to --guides--.

Signed and Sealed this

Twenty-seventh Day of October, 1998

*Attest:*

BRUCE LEHMAN

*Attesting Officer*     *Commissioner of Patents and Trademarks*